US012314974B2

(12) United States Patent
Hage et al.

(10) Patent No.: US 12,314,974 B2
(45) Date of Patent: *May 27, 2025

(54) SYSTEMS AND METHODS TO FACILITATE PROVIDING A SOFTWARE DEVELOPMENT KIT (SDK) FOR REWARDS FOR MAKING GIFT CARD PURCHASES TO MULTIPLE APPLICATION PUBLISHERS

(71) Applicant: GCOW LLC, Las Vegas, NV (US)

(72) Inventors: Chadi Hage, Las Vegas, NV (US); Kamil Grzych, North Hollywood, CA (US)

(73) Assignee: GCOW LLC, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/387,830

(22) Filed: Nov. 7, 2023

(65) Prior Publication Data

US 2024/0070702 A1    Feb. 29, 2024

Related U.S. Application Data

(63) Continuation of application No. 16/380,910, filed on Apr. 10, 2019, now Pat. No. 11,810,140.

(60) Provisional application No. 62/789,229, filed on Jan. 7, 2019.

(51) Int. Cl.
| G06Q 30/0207 | (2023.01) |
| G06Q 20/34 | (2012.01) |
| G06Q 20/36 | (2012.01) |
| G06Q 20/38 | (2012.01) |
| G06Q 30/0234 | (2023.01) |

(52) U.S. Cl.
CPC ....... *G06Q 30/0209* (2013.01); *G06Q 20/351* (2013.01); *G06Q 20/3678* (2013.01); *G06Q 20/381* (2013.01); *G06Q 30/0222* (2013.01); *G06Q 30/0234* (2013.01)

(58) Field of Classification Search
None
See application file for complete search history.

(56) References Cited

U.S. PATENT DOCUMENTS

| 2008/0270240 A1* | 10/2008 | Chu | G06Q 30/0239 |
| | | | 434/350 |
| 2013/0117181 A1* | 5/2013 | Isaacson | G06Q 30/0224 |
| | | | 705/41 |
| 2016/0027124 A1* | 1/2016 | Rojas | G06Q 30/06 |
| | | | 705/30 |
| 2018/0077096 A1* | 3/2018 | DeMattei | G06Q 30/02 |

(Continued)

*Primary Examiner* — Michael J Sittner
(74) *Attorney, Agent, or Firm* — Newman Law, LLC (57) ABSTRACT

A software development kit (SDK) allow a user to be able purchase a gift card through an offer wall and, in return, the user can receive a reward in game currency, such as coins, diamonds, tokens or the like. Most mobile apps offer their users a way to purchase coins, diamonds, tokens, or the like, which is also known as an in-app purchase. The gift card offer wall can allow the game player to purchase a gift card from a choice of vendors, and, in return, obtain the desired game currency as a bonus. The system can include three elements—the SDK for various platforms, an electronic wallet application and servers that communicate with both the SDK and the wallet application. The SDK is something that the app publisher can add to their own mobile application that will launch the gift card offer wall for the user.

18 Claims, 9 Drawing Sheets

(56) References Cited

U.S. PATENT DOCUMENTS

2018/0160158 A1\* 6/2018 Liu .................. G06Q 30/02
2019/0156370 A1\* 5/2019 Harrison ............ G06Q 30/0275

\* cited by examiner

SYSTEMS AND METHODS TO FACILITATE PROVIDING A SOFTWARE DEVELOPMENT KIT (SDK) FOR REWARDS FOR MAKING GIFT CARD PURCHASES TO MULTIPLE APPLICATION PUBLISHERS

CROSS-REFERENCE TO RELATED APPLICATIONS

This application claims the benefit of priority to U.S. Provisional patent application No. 62/789,229, filed Jan. 7, 2019, the contents of which are herein incorporated by reference.

BACKGROUND OF THE INVENTION

1. Field of the Invention

The present invention relates generally to a field of data processing. More specifically, the present disclosure relates to systems and methods to facilitate providing a software development kit (SDK) that can provide rewards, such as private virtual currency or in-app rewards, for the purchase of specific goods, such as gift cards.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Existing techniques for providing cash back offers on multiple application platforms are deficient with regard to several aspects. For instance, current technologies do not allow publishers and/or developers to develop applications based on a software development kit designed specifically for making cash back exchange dynamic and/or in real time. Further, in another instance, current technologies do not allow a user to access a list of stores, products, deals, coupons, gift card and categories etc. along with cash back information that may be offered by multiple brands on a single platform. Furthermore, current technologies, in an instance, may not be based on blockchain technologies for handling transactions associated with the cash back earned by the user.

Therefore, there is a need for improved systems and methods to facilitate providing a software development kit (SDK) for providing offers to multiple application publishers that may overcome one or more of the above-mentioned problems and/or limitations.

SUMMARY OF THE INVENTION

According to some embodiments, a system to facilitate providing an SDK (software development kit) for an offer wall to a one or more of publishers is disclosed. Accordingly, the system may include, but not limited to, an SDK, one or more of publishers, a server, and the like.

According to some embodiments, a method to facilitate providing an SDK (software development kit) for a virtual private currency or gift card offer wall to a one or more of publishers is disclosed. Accordingly, the method may include a step of receiving, using a communication device, a request to register an account from a publisher device. Further, the method may include a step of adding, using a processing device, the SDK to an APK associated with the application developed by the publisher. Further, the method may include a step of receiving, using the communication device, conversation rates from the publisher device. Further, the method may include a step of storing, using a storage device, the conversation rates.

Embodiments of the present invention provide a system for offering a product to a user of a mobile application comprising a software development kit allowing a publisher of the mobile application to include a feature for a user to launch a gift card offer wall from within the mobile application; an electronic wallet for a user of the mobile application, the electronic wallet providing a location to electronically store data regarding the product purchased by the user front the gift card offer wall; at least one server providing communication between the mobile application, the software development kit and the electronic wallet, wherein when the user launches the gift card offer wall from within the mobile application and purchases the product from the gift card offer wall, the server communicates to the mobile application to reward the user with a predetermined amount of in-app tokens.

Embodiments of the present invention further provide a method for providing a reward for the purchase of a product comprising providing a link, via a software development kit used in a mobile application, to permit a user of the mobile application to access a gift card offer wall from within the mobile application; displaying, on a computing device of the user, one or more products available for purchase by the user and an amount of currency to be granted to the user in the mobile application upon purchase of one of the one or more products; and providing electronic communication between the mobile application, the gift card offer wall and the software development kit via a server, wherein when the user launches the gift card offer wall from within the mobile application and purchases the product from the gift card offer wall, the server communicates to the mobile application to reward the user with a predetermined amount of currency.

Embodiments of the present invention also provide a method for providing in-app tokens for the purchase of a gift card comprising providing a link, via a software development kit used in a mobile application, to permit a user of the mobile application to access a gift card offer wall from within the mobile application; displaying, on a computing device of the user, one or more gift cards available for purchase by the user and an amount of the in-app tokens to be granted to the user in the mobile application upon purchase of one of the one or more gift cards; electronically storing data regarding the gift card purchased by the user from the gift card offer wall in an electronic wallet; and providing electronic communication between the mobile application, the gift card offer wall and the software development kit via a server, wherein when the user launches the gift card offer wall from within the mobile application and purchases the gift card from the gift card offer wall, the server communicates to the mobile application to reward the user with a predetermined amount of the in-app tokens.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system or method, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a software development kit (SDK) allowing a user to be able purchase a product, such as a gift card, through an offer wall and, in return, the user can receive a reward in game currency, such as coins, diamonds, tokens or the like. Most mobile apps offer their users a way to purchase coins, diamonds, tokens, or the like, which is also known as an in app purchase. For example, a user spends $10 and receives a certain amount in game currency. The gift card offer wall can allow the game player to purchase a gift card to one of various vendors, and, in return, obtain the desired game currency as a bonus. The gift card offer wall can include three elements—the SDK for various platforms, such as Android and iOS, an electronic wallet application and servers that communicate with both the SDK and the wallet application.

The SDK is something that the app publisher can add to their own mobile application that will launch the gift card offer wall for the user. From there, the user will be able to select a gift card that they would like to purchase and, for doing so, they will receive the gift card and an in app currency reward for completing the purchase. The SDK may further include a receive feature that can generate a QR code for users to transfer currency from the wallet to that application directly. The app publisher can maintain full control from their dashboard as far as what $1 will be worth in their in app currency for their mobile game.

Users will be able to sign up for the electronic wallet to add gift cards that they purchased through the SDK and also purchase gift cards from the wallet itself. The wallet serves as a way to monetize apps outside of the app itself.

Figure 7:
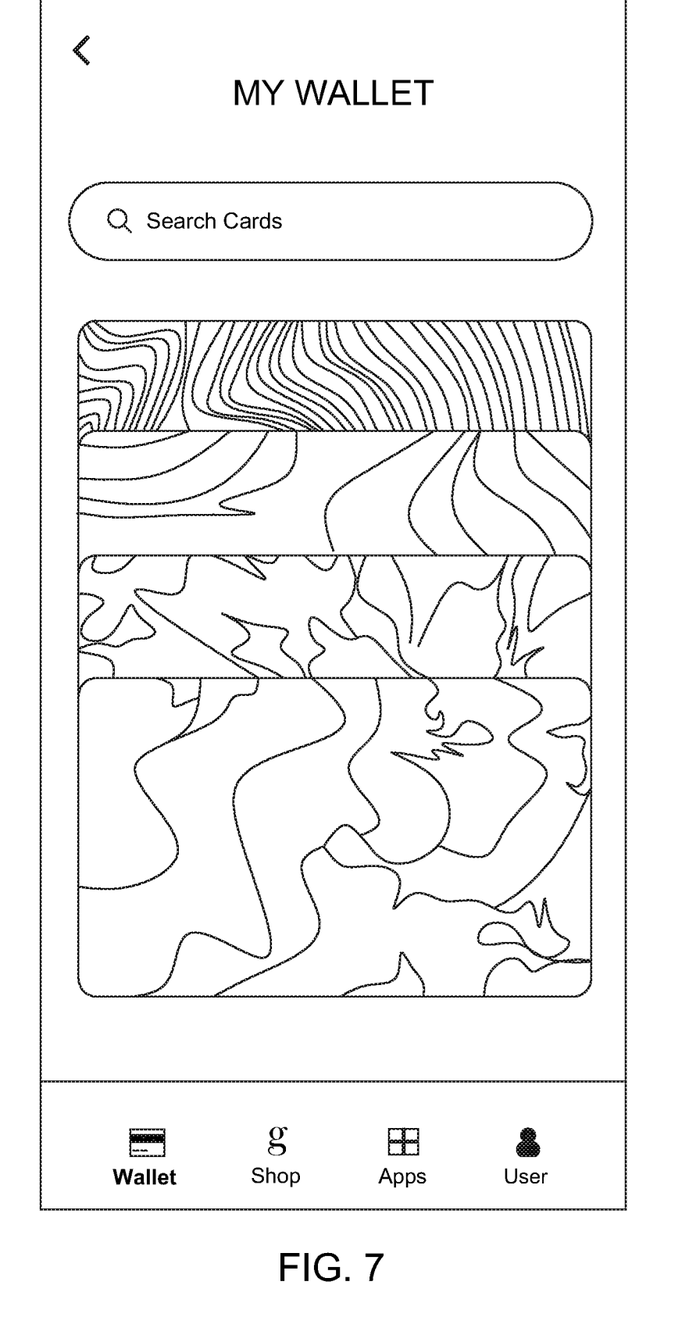
FIG. 7 illustrates an exemplary representation of an electronic wallet provided to a user, showing various gift cards (shown with curved line artwork) available to the user.
Figure 8:
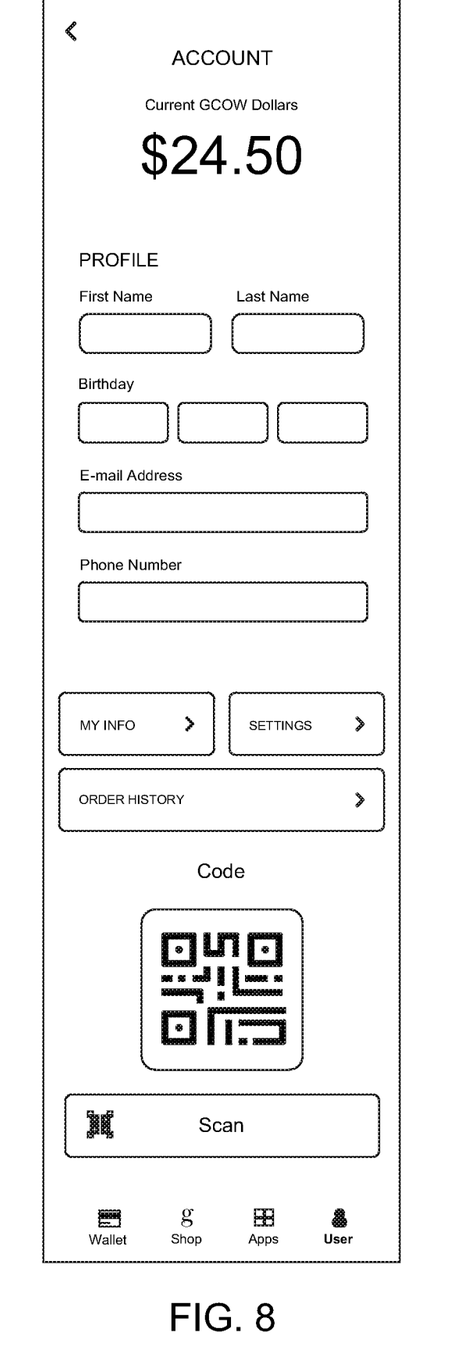
FIG. 8 illustrates an exemplary representation of an electronic wallet provided to a user, showing the amount of private virtual currency remaining in their account and a code that a user can scan to send currency to the user's account.

Referring to FIGS. 7 and 8, when the user buys a gift card through the wallet they may earn "GLOW dollars", also referred to as reward currency. The reward currency (GCOW dollars) can be converted to in app currency. To do so, the user can view the list of apps that utilize the SDK and will be able to choose how much reward currency they want to convert for that specific in app currency and it will show up on that specific app under their account. The user will also have the chance to send reward currency to an electronic wallet of another user of the application of the present invention or may use a scan feature to send the coins directly to that specific application account via the QR code (as shown in FIG. 8). For example, a parent can buy a gift card through their electronic wallet of the application of the present invention and their child can open the application that they are using (that utilizes the SDK of the present invention) and click receive and the parent will be able to scan that from their device and send the in-app currency that way. The wallet may further include a function to permit the user to scan other user's code, to permit the user to send currency to the other user. The information can get sent to server, where the reward currency (GCOW dollars) are converted to that in app currency and it shows up under that account.

The wallet can also determine if the user has the app installed from the list, if they don't, the server can notify them and take them to the proper application store to download it.

The server acts as the hub for the service. The server communicates between the SDK, the app publisher's mobile apps, and the electronic wallets. The app publishers register their information, and the server can generate appropriate tokens or the like. The publisher can enter what $1 is worth in their in app currency and the server can convert that in real time when a purchase is made.

Accordingly, the offer wall, in an instance, may be a user interface through which a user (and/or a customer) may be able to interact with the system to earn back a virtual private currency or in-app game currency. As used herein, the term "virtual private currency" may refer to actual currency (cash); game currency in the form of tokens, diamonds, coins, or the like; or currency usable to make a later purchase, such as a purchase of tokens, diamonds, coins or the like, in a particular game.

Figure 3:
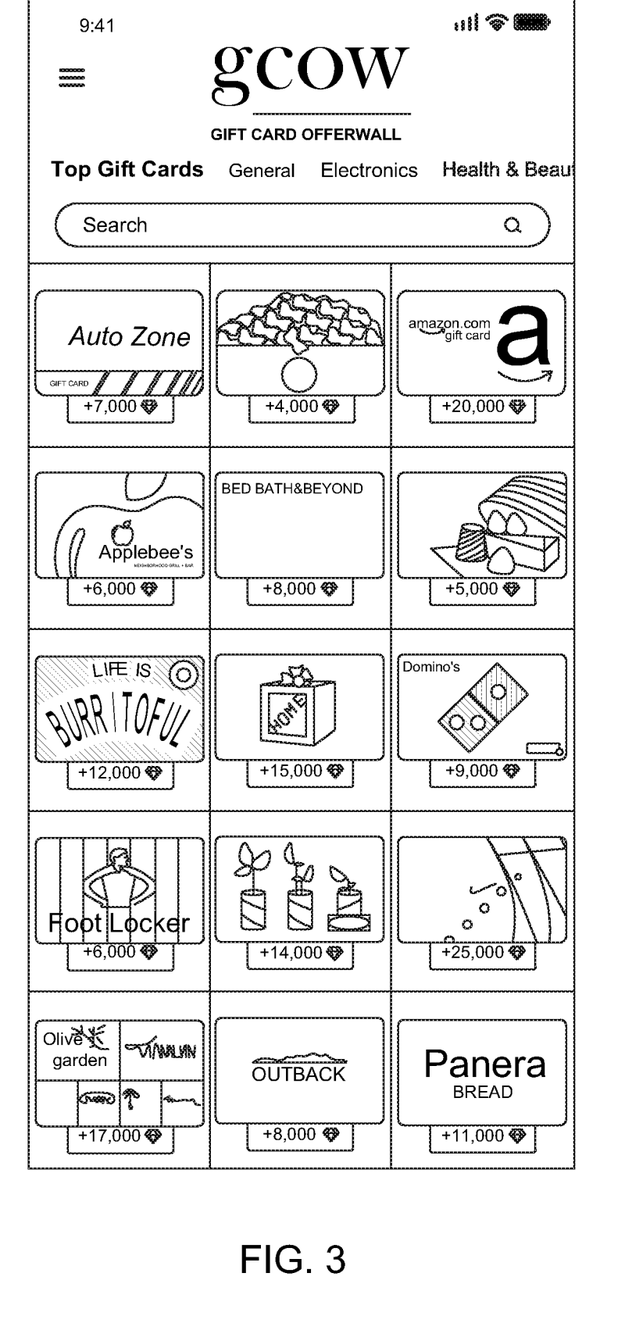
FIG. 3 illustrates an exemplary representation of a gift card offer wall, according to exemplary embodiments of the present invention.

The user interface may include a plurality of interactive sections such as a menu section, a catalog section and the like. The menu section, in some embodiments, may provide additional features (such as customer support and tracking) to the users. The catalog section, in some embodiments, may be a section that may be configured to provide a product space for a one or more of products. The product space, in some embodiments, may be a virtual space which may include information associated with the one or more products. For instance, the product space may include information such as a product type, a multimedia (such as a picture associated with the product), the reward offered, a brand name associated with the product and the like. Further, the user interface may include a list of stores, products, deals, coupons, gift cards and/or categories. Further, the user interface may include information about the listing. For instance, as shown in FIG. 3, a user can select "Top Gift Cards" where a list of multiple brands, along with an amount if in app "diamonds" is shown for each of the multiple brands. Of course, in place of in app "diamonds", other in app game currency may be offered for the purchase of gift cards. The screen, such as that of FIG. 3 may be displayed when a user enters the gift card offer wall via a particular software app utilizing the SDK of the present invention. In this manner, the gift card offer wall can offer the appropriate number of "diamonds" (in the current example) to the user, which are usable in the game application from which they came.

Figure 5:
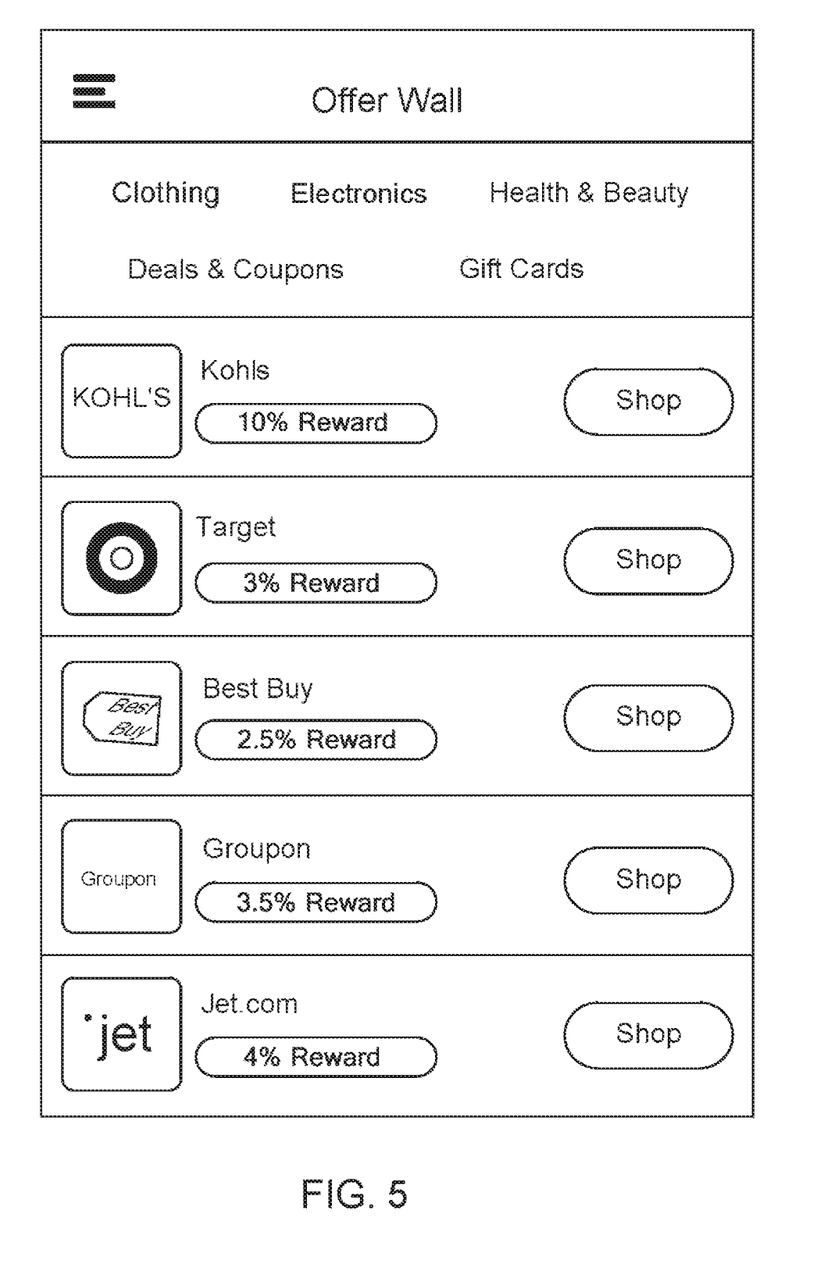
FIG. 5 illustrates another exemplary representation of the offer wall according to an exemplary embodiment of the present invention.

As shown in FIG. 5, the wall offer may include a list of stores and/or e-commerce sites (such as Kohls, Target, Best Buy, Groupon, Jet.com etc.) along with a percentage of private virtual currency offered by the clothing related stores and/or e-commerce sites (such as 10% reward back may be offered by Kohls, and/or 3% reward back may be offered by Target). When the user purchases such a gift card, they may receive rewards in reward currency (GCOW dollars) which may be used to make in app purchases in those applications that utilize the SDK of the present invention.

The SDK may give access to any mobile application publisher to list stores, products, coupons, and others where users may shop and receive rewards back in form of in app tokens.

The SDK, in some embodiments, may use blockchain technology for handling transactions. Further, for the offer wall to work, the one or more publishers (such as an application publisher, and/or a developer) may have to add the SDK to their APK (Android Package Kit), for example.

The publisher may configure proper callbacks and/or may use an API (Application Programming Interface) based on the SDK of the offer wall. An application owner (and/or the publisher), in an instance, may have access to set up conversation rates, making exchange dynamic and in real time. For instance, for every $1 that a customer earns in private virtual currency may be worth 1000 in-app tokens.

Brands may also have access to a dedicated backend where they (the brands) may be able to bid in real time for product space within the SDK.

Embodiments of the present invention may include elements such as (but not limited to) the SDK, server, dashboard, market place dashboard and the like. Further, the SDK, in some embodiments, may include components that need to be added to the publisher's application. Further, the SDK, in some embodiments, may use a web view that may be remotely controlled from a server end in order to change listings without updating the application.

In some embodiments, the SDK may connect to a server to handle listings, process rewards back and/or send proper amounts to the publisher. Further, the server, in some embodiments, may include a dashboard that may provide server access for the publishers to track conversations and set up what $1 may worth in points (and/or in-app tokens).

The server, in some embodiments, may include a market place dashboard that may provide server access for brands that may bid for product space on the SDK in real time.

A process for providing the SDK for the offer wall to the one or more publishers may include registering accounts for the one or more publishers with the server. Each publisher of the one or more publishers, may register an account with the server by interacting with an Internet of Things (IoT) based device (such as a smartphone, a PC, a laptop, or the like).

The process may include adding the SDK to an APK associated with the application of the publisher. Further, the process may include setting up of conversation rates by the publishers. Further, the publisher may set up conversation rates along with how the SDK may be triggered. Further, the process may include a tracking of transactions. Further, once implemented, (when the user shops) the server may track any information associated with the transaction and/or may send rewards back in form of in-app tokens to the application.

Further, once the SDK is implemented, the publisher may trigger the SDK between app levels or the SDK may be launched when the user clicks on a dedicated button in the publisher's application. Further, there may be a menu with additional features like customer support and tracking. Further, on the front, the SDK may list stores, products, deals, coupons, gift card, categories and the like. Further, each listing may show information about the listing. Once clicked by the user, the application can open a dedicated page about that store and, from there, it may take them to the official store page. Within the store page, the user may have other options to earn points (such as the in-app tokens) by taking a picture of a product, scanning receipts, showing an AR version of the product in real time using the phone's camera, or the like.

The SDK, in some embodiments, may collect data from the phone and user. The data may include information such as (but not limited to) IMEI number, shopping history, Android ID, Pub ID (publisher's ID), information associated with the product purchased, location, monthly active users of the application, data submitted via a one or more sensors (such as phone's camera) like receipts, credit cards, objects, and the like.

A flow of information associated with the system and method disclosed herein may include three segments. First, all transactions, in an instance, may be processed by the server and values may be returned via call backs and/or API to the publisher's application and servers. Second, when a publisher wants to set up currency conversation rate, then the publisher may access site and/or the server that may push the information associated with the conversation rate to the application. Third, when a user shops within the SDK, the server may act as a middleman and/or may receive sales data from the store and push data to the publisher's applications and servers to award the user with proper amount of currency.

Figure 1:
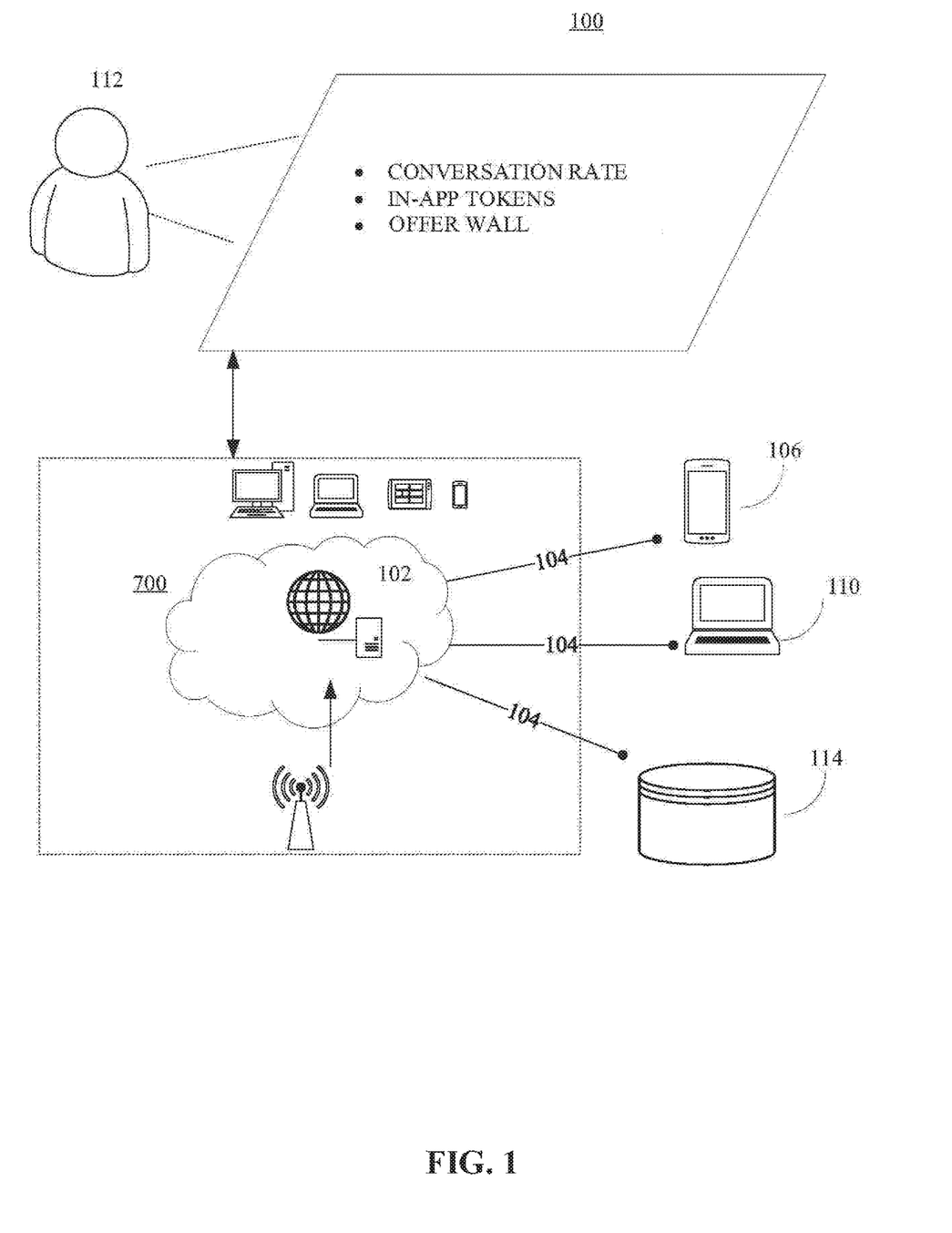
FIG. 1 illustrates an online platform consistent with various embodiments of the present invention.

Referring to FIG. 1, there is shown is an illustration of an online platform 100 consistent with various embodiments of the present invention. By way of non-limiting example, the online platform 100 can facilitate providing a software development kit (SDK) for reward offers to multiple application publishers. The online platform 100 may be hosted on a centralized server 102, such as, for example, a cloud computing service. The centralized server 102 may communicate with other network entities, such as, for example, a mobile device 106 (such as a smartphone, a laptop, a tablet computer or the like), other electronic devices 110 (such as desktop computers, server computers or the like), and databases 114 over a communication network 104, such as, but not limited to, the Internet. Further, users of the online platform 100 may include relevant parties such as, but not limited to, end users, application publishers and/or application developers, and administrators. Accordingly, in some instances, electronic devices operated by the one or more relevant parties may be in communication with the online platform 100.

A user 112, such as the one or more relevant parties, may access the online platform 100 through a web based software application or browser. The web based software application may be embodied as, for example, but not be limited to, a website, a web application, a desktop application, and a mobile application compatible with a computing device 700.

Further, the online platform 100 may be configured for providing an SDK for an offer wall to a one or more of publishers.

Accordingly, the SDK, in some embodiments, may be a software development kit that may include a set of software development tools allowing the one or more publishers to create a one or more of applications in order to implement the offer wall. Further, the one or more publishers, in exemplary embodiments, may be individuals, organizations and/or entities that may be configured to create (and/or develop) the one or more applications based on the SDK. The one or more applications based on the SDK, in some embodiments, may be configured to allow a one or more of users to interact with the online platform 100 through a one or more of user devices. The one or more user devices, in some embodiments, may include any device that may be configured to communicate with the online platform 100. Further, the one or more user devices, in some embodiments, may include IoT based devices such as (but not limited to) smartphones, smartwatches, laptops, PCs and the like. The one or more applications based on the SDK, in some embodiments, may be configured to be executed on a plurality of operating systems associated with the one or more user devices. The plurality of operating systems, in some embodiments, may include, but not limited to, Android OS, iOS, MacOS, Windows OS, Blackberry OS, Symbian OS, or the like.

In some embodiments, the SDK may provide components that may need to be added to the one or more applications in order to implement the offer wall. The SDK, in some embodiments, may use webview which may be remotely controlled by the online platform 100 in order to modify and/or alter an interface associated with the one or more applications without updating the entire application. The offer wall, in some embodiments, may be a user interface through which a user (and/or a customer) may be able to interact with the online platform 100 to earn rewards.

The online platform 100 may receive, using a communication device, a request to register an account from a publisher device. Accordingly, the publisher device, in some embodiments, may be an IoT based device that may be operated by the one or more publishers and/or may be configured to communicate with the online platform 100.

The publisher device, in an instance, may include devices such as (but not limited to) smartphones, smartwatches, laptops, PCs and the like. Further, the account associated with a publisher, in some embodiments, may be a user profile for the publisher that may include information associated with the publisher such as (but not limited to) a type of application developed by the publisher, a name associated with the publisher or the like.

The online platform 100 may add, using a processing device, the SDK to an APK associated with the application developed by the publisher. Accordingly, the APK (Android application package), in some embodiments, may be a file format associated with the application developed by the publisher.

The online platform 100 may receive, using the communication device, conversation rates from the publisher device. Accordingly, the conversation rates may be an exchange rate that may be set by the publisher, which may reflect a magnitude of in-app tokens that may be equivalent to a real currency. Further, the in-app tokens, in some embodiments, may be points that may be converted into real currency based on the conversation rate that may set by the publishers of the one or more applications. For instance, for every $1 in virtual private currency that a user (and/or a customer) earns from a purchase of a gift card, this value may be worth 1000 in-app tokens. Alternatively, the user may be permitted, in some instances, to "cash-in" their in-app tokens in one game application to convert them to private virtual currency. This conversion rate may be independent from the purchase rate. For example, a user may be permitted to convert their 1000 in-app tokens for $0.50. This $0.50 may then be stored in the user's electronic wallet for future use on in-app purchases, gift card purchases, or the like.

The online platform 100 may store, using a storage device, the conversation rates set by the one or more publishers. Accordingly, the publisher may set up conversation rates along with how the SDK may be triggered. For instance, the publisher may trigger the SDK between application levels and/or the SDK may be launched when the user may click on a dedicated button in the publisher's application.

The SDK, in some embodiments, may include a menu with additional features such as (but not limited to) customer support and tracking. Further, a front of the SDK may list, for example, stores, products, deals, coupons, gift card, categories and the like. Each listing may show information about the listing. For instance, once clicked by the user, the SDK may open a dedicated page about that store. From the dedicated page, the SDK may take the user (and/or consumer) to an official store page. Within the official store page, the user may have other options to earn points (such as the in-app tokens) by taking a picture of a product, scanning receipts, showing an AR version of the product in real time using a phone's camera or the like. In some embodiments, the online platform 100 may track transactions associated within the one or more applications based on the SDK. For instance, when a user shops through the one or more applications, the online platform 100 may track any information associated with the transaction (such as, but not limited to, transaction amount, date, time, payee's identity, payer's identity, and the like) and/or may send rewards in the form of in-app tokens to the one or more applications. The online platform 100, in some embodiments, may be configured to transmit the rewards in the form of in-app tokens to the one or more applications through a wireless transmitter. The wireless transmitter, in an instance, may transmit the rewards over, but not limited to, a Wi-Fi, a Bluetooth, an electromagnetic waveform, ultra-sound, cellular (SG) and/or an Infra-red or the like.

In some embodiments, the SDK may collect data from the one or more user devices associated with a one or more of users. The data may include information such as (but not limited to) IMEI number, shopping history, Android ID, Pub ID (publisher's ID), information associated with the product purchased, location, monthly active users of the application, data submitted via a one or more sensors (such as phone's camera) like receipts, credit cards, objects, or the like.

Further, a flow of information through the online platform 100, in some embodiments, may include three segments. First, the transactions may be processed by the online platform 100 and values may be returned via call backs and/or API to the publisher's application and servers. Second, when a publisher wants to set up the conversation rates, the publisher may access the online platform 100 (through the publisher device) that may push information associated with the conversation rates to the application. Third, when a user shops within the SDK, the online platform 100 may act as a middleman and/or may receive sales data from the store and/or push data to the publisher's applications and servers to award the user with proper amount of currency.

Figure 2:
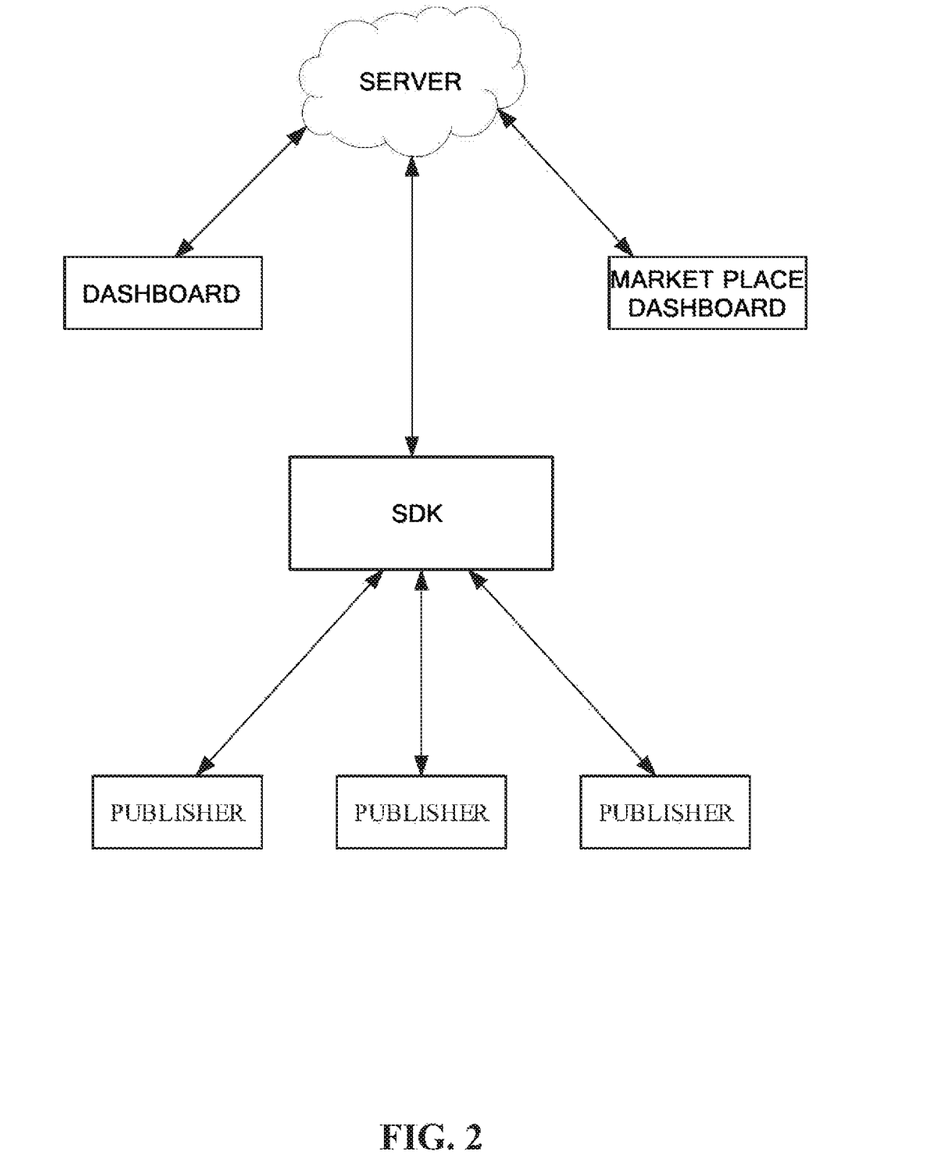
FIG. 2 illustrates a system to facilitate providing an SDK (software development kit) for an offer wall to a one or more of publishers, in accordance with exemplary embodiments of the present invention.

FIG. 2 illustrates a system configured to provide an SDK (Software Development Kit) for an offer wall to a one or more of publishers. Accordingly, the SDK, in some embodiments, may be a software development kit that may include a set of software development tools allowing the one or more publishers to create a one or more of applications in order to implement the offer wall. The one or more publishers may be individuals, organizations and/or entities that may be configured to create the one or more applications based on the SDK. The one or more applications based on the SDK, in some embodiments, may be configured to allow a one or more of users to interact with the system through a one or more of user devices. The one or more user devices, in some embodiments, may include IoT based devices such as (but not limited to) smartphones, smartwatches, laptops, PCs and the like. Further, the one or more applications based on the SDK may be configured to be executed on a plurality of operating systems associated with the one or more user devices. The plurality of operating systems may include, but not limited to, Android OS, iOS, MacOS, Windows OS, Blackberry OS, Symbian OS and the like. In some embodiments, the SDK may provide components that may need to be added to the one or more applications in order to implement the offer wall. Further, the SDK may use webview which may be remotely controlled by the server in order to modify and/or alter an interface associated with the one or more applications without updating the entire application.

The offer wall, in some embodiments, may be a user interface through which a user (and/or a customer) may be able to interact with the system to earn rewards. The user interface, in an instance, may include a plurality of interactive sections such as a menu section, a catalog section and the like. The menu section, in some embodiments, may provide additional features (such as customer support and tracking) to the one or more users. The catalog section, in some embodiments, may be a section that may be configured to provide a product space for a one or more of products. The product space, in some embodiments, may be a virtual space which may include information associated with the one or more products. For instance, the product space may include information such as a product type, a multimedia (such as a picture associated with the product), a reward offered, a brand name associated with the product and the like. The offer wall, in some embodiments, may include a list of stores, products, deals, coupons, gift cards and/or categories. The offer wall, in some embodiments, may include information about the listing. For instance, as shown in FIG. 3, for a gift card category, the wall offer may include a list of multiple brands along with an amount of in-app tokens that may be earned for each brand. Further, as shown in FIG. 5, for a clothing category, the wall offer may include a list of clothing related stores and/or e-commerce sites (such as Kohls, Target, Best Buy, Groupon, Jet.com etc.) along with a percentage of rewards offered by the clothing related stores and/or e-commerce sites (such as a 10% reward may be offered by Kohls, and/or a 3% reward may be offered by Target). In some embodiments, the gift card wall of FIG. 3 may be used when the gift card wall is entered via the SDK from within a particular software application, such as a game, where the user desires to purchase tokens, such as diamonds in this example. Instead of purchasing the in-app tokens (diamonds) in the game software directly, the user may opt to purchase a gift card via the gift card offer wall of FIG. 3, where the user may then receive diamonds as an added bonus to their gift card purchase. In other embodiments, the gift card wall of FIG. 5 may be used when the user goes to the gift card wall directly, without accessing via any particular software application. In this case, when the user purchases a gift card, they may earn virtual private currency in their wallet, that may be later used for an in-app purchase from within a software application or game that has set a currency conversion rate for the purchase of in-app tokens.

The percentage of rewards earned by a user (and/or a customer) through the offer wall, in some embodiments, may be stored by the server (through a storage device) in a form of in-app tokens. Further, the in-app tokens, in some embodiments, may be points that may be converted into private virtual currency based on a conversation rate that may set by the publishers of the one or more applications. For instance, every $1 in private virtual currency that a user (and/or a customer) earns in rewards may be worth 1000 in-app tokens.

In some embodiments, the system may include a dashboard that may provide server access for the one or more publishers and may be configured to track conversations (and/or transactions) and/or to set up a magnitude associated with the in-app tokens that may be equivalent to unit real currency (such as 1$). Further, the SDK, in some embodiments, may be based on blockchain technology in order to handle transactions. Further, the SDK may be configured to store the transactions in a blockchain file server. The blockchain file server may include a growing list of records which may be linked using cryptography in order to maintain integrity for records associated with the transactions. The SDK, in some embodiments, may be communicatively coupled to the server in order to handle listing, processing rewards, and/or sending a proper amount to the publisher.

In some embodiments, the system may include a market place dashboard. The market place dashboard, in some embodiments, may be a server access for a one or more of brands that may bid for the product space on the SDK in real-time. The one or more brands may be configured to access the server through any IoT device such as, but not limited to, a smartphone, a smartwatch, a laptop, a PC and the like.

Figure 4:
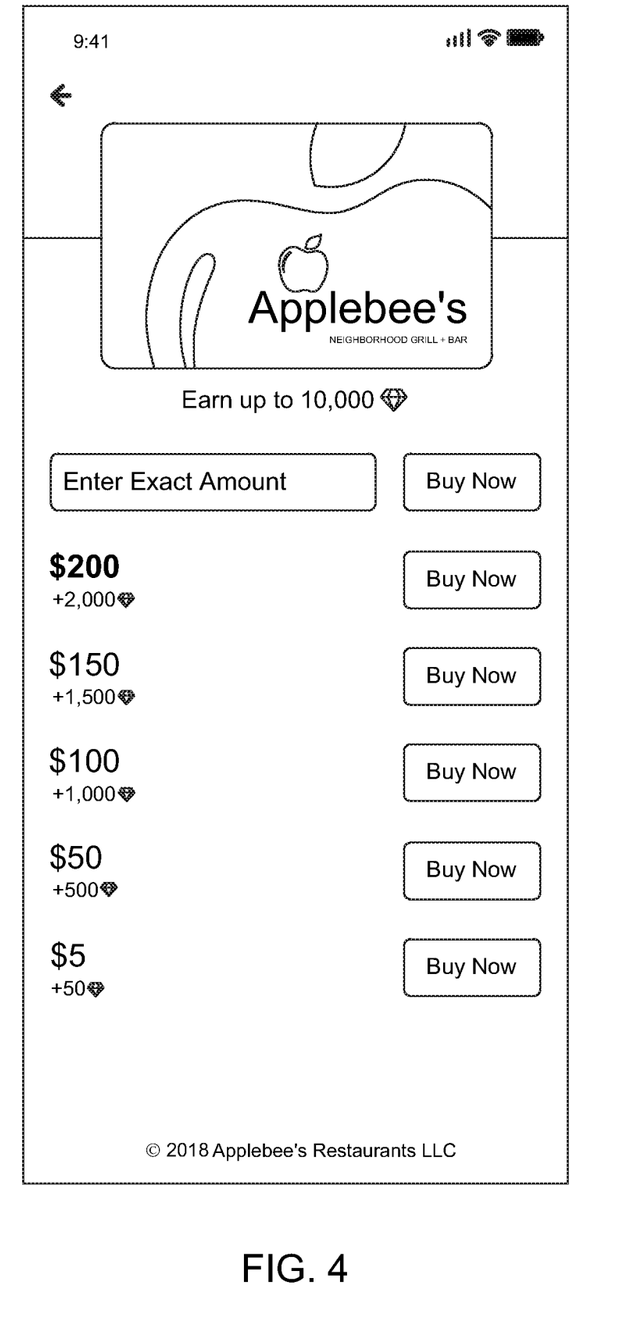
FIG. 4 illustrates an exemplary representation of a dedicated page that may provide information such as a reward (in specific application currency) that may be offered by a brand (such as Applebee's®), in accordance with exemplary embodiments of the present invention.
Figure 6:
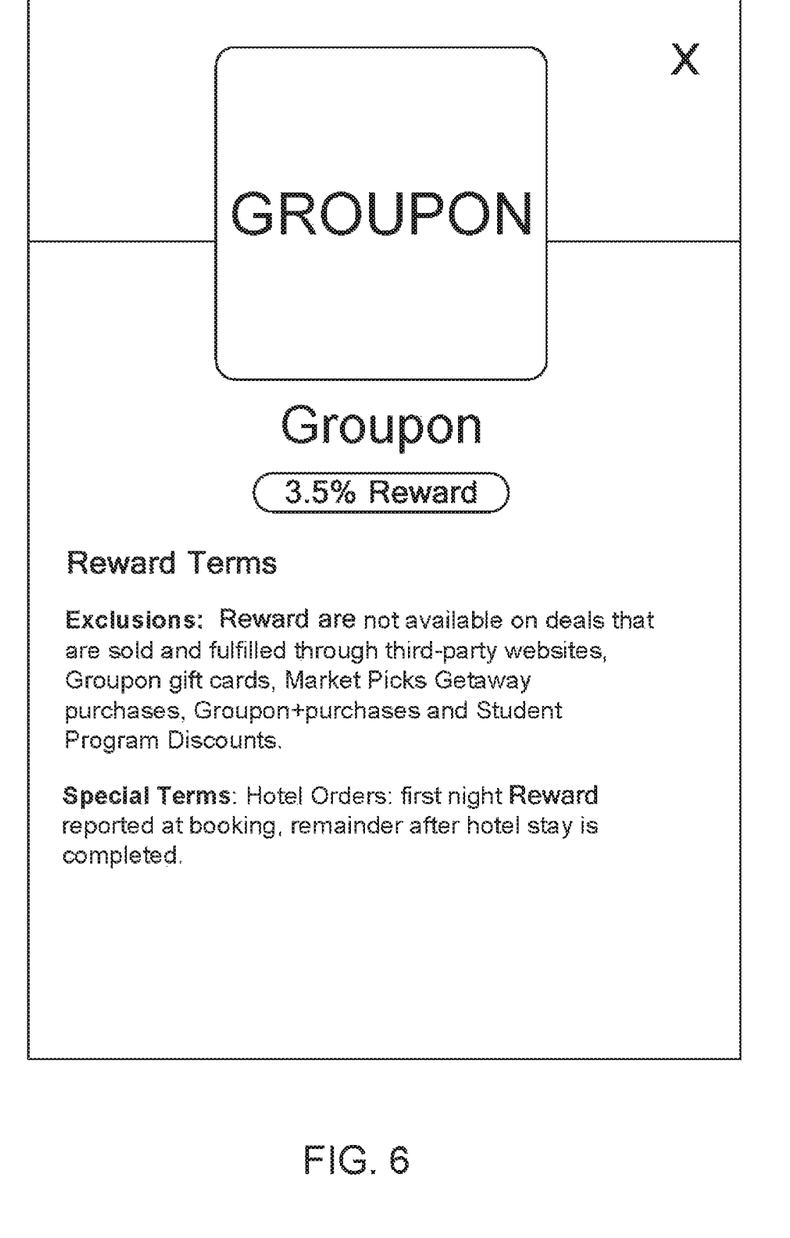
FIG. 6 illustrates an exemplary representation of a dedicated page that may provide information such as terms (exclusions and/or special terms) associated with a store (such as Groupon®), in accordance with exemplary embodiments of the present invention.

In some embodiments, the one or more users may interact with the list through the one or more user devices. For instance, a user may select a store and/or a product by interacting through a user device (such as by tapping and/or clicking on a display panel of a laptop through a cursor or trackpad). Once the user selects a store from the list, the application based on the SDK may open a dedicated page about that store. The dedicated page, in some embodiments, may provide information associated with the store that may be of something of interest to the user. For instance, as shown in FIG. 4, the dedicated page may provide information such as the reward (shown in in-app tokens, for example) that may be offered by a brand (such as Applebee's®). In some embodiments instance, as shown in FIG. 6, the dedicated page may provide information such as reward terms (exclusions and/or special terms), multimedia (such as a visual content and/or a picture) associated with the store (such as Groupon®), a percentage of rewards offered, or the like.

In some embodiments, from the dedicated page about the store, the application based on the SDK may be configured to allow the user to access an official store page associated with the store. Further, within the official store page, the user may have other options to earn the in-app tokens. For instance, the user may earn the in-app tokens (but not limited to) by taking a picture of the product, scanning receipts, showing an AR version of the product in real time using a one or more of sensors that may be embedded within the user device or the like. The one or more sensors, in an instance, may include, but not limited to, light sensors, microphone sensors or the like.

In some embodiments, the SDK may collect data from the one or more user devices associated with the one or more user. The data may include information such as (but not limited to) IMO number, shopping history, Android ID, Pub ID (publisher's ID), information associated with the product purchased, location, monthly active users of the application, data submitted via one or more sensors (such as phone's camera) like receipts, credit cards, objects, or the like.

In some embodiments, the SDK may include a means for establishing a gift card marketplace, where other gift card companies may be permitted to place their cards for sale on the offer wall.

Figure 9:
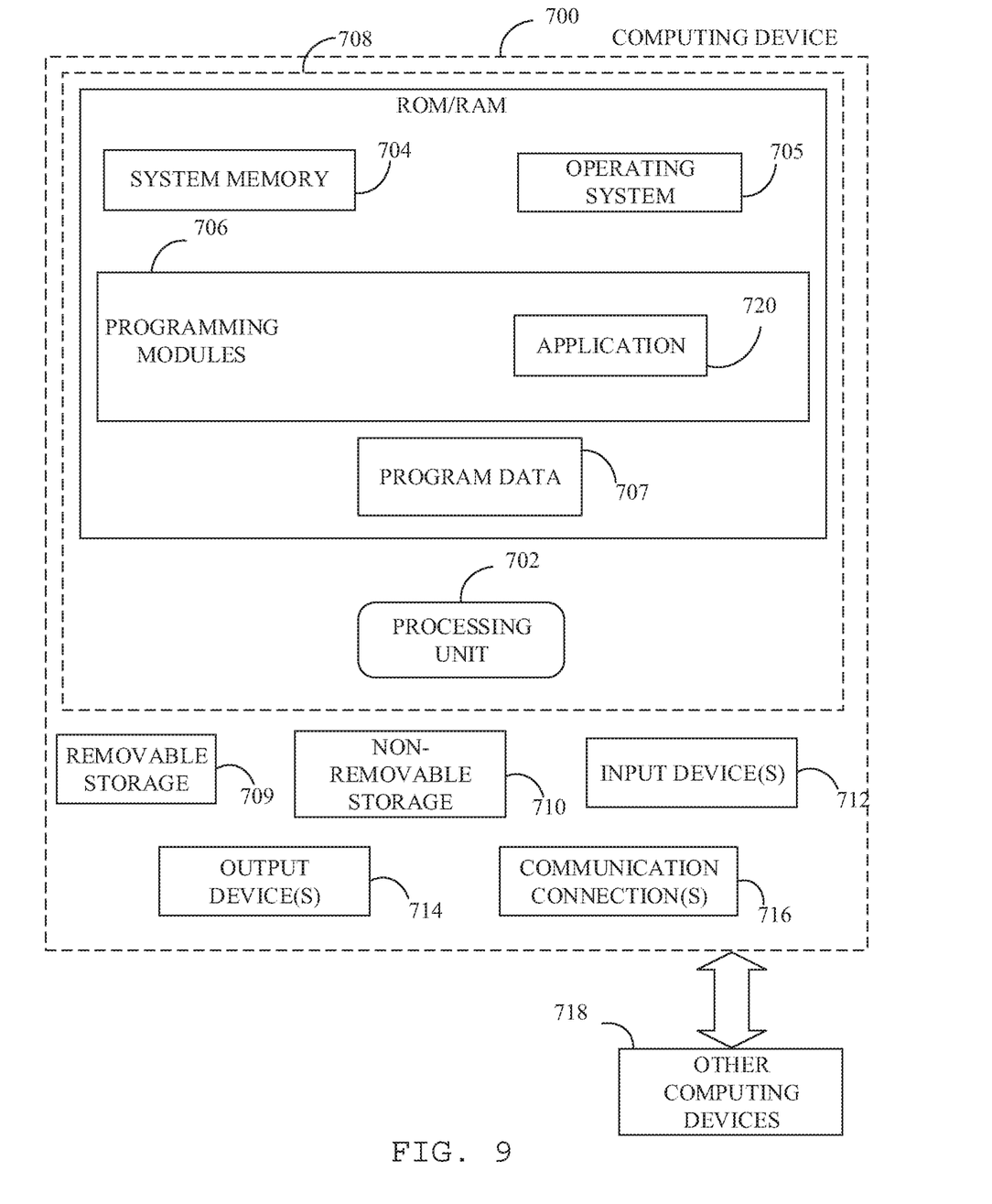
FIG. 9 illustrates a block diagram of a computing device for implementing the methods according to exemplary embodiments of the present invention.

With reference to FIG. 9, a system consistent with an embodiment of the present invention may include a computing device or cloud service, such as computing device 700. In a basic configuration, computing device 700 may include at least one processing unit 702 and a system memory 704. Depending on the configuration and type of computing device, system memory 704 may comprise, but is not limited to, volatile (e.g. random-access memory (RAM)), non-volatile (e.g. read-only memory (ROM)), flash memory, or any combination. System memory 704 may include operating system 705, one or more programming modules 706, and may include a program data 707. Operating system 705, for example, may be suitable for controlling computing device 700's operation. In one embodiment, programming modules 706 may include image-processing module, machine learning module and/or image classifying module. Furthermore, embodiments of the present invention may be practiced in conjunction with a graphics library, other operating systems, or any other application program and is not limited to any particular application or system. This basic configuration is illustrated in FIG. 9 by those components within a dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 9 by a removable storage 709 and a non-removable storage 710. Computer storage media may include volatile and nonvolatile, removable and non-removable media implemented in any method or technology for storage of information, such as computer-readable instructions, data structures, program modules, or other data. System memory 704, removable storage 709, and non-removable storage 710 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700.

Computing device 700 may also have input device(s) 712 such as a keyboard, a mouse, a pen, a sound input device, a touch input device, a location sensor, a camera, a biometric sensor, or the like. Output device(s) 714 such as a display, speakers, a printer, or the like, may also be included. The aforementioned devices are examples and others may be used.

Computing device 700 may also contain a communication connection 716 that may allow device 700 to communicate with other computing devices 718, such as over a network in a distributed computing environment, for example, an Intranet or the Internet.

Communication connection 716 is one example of communication media. Communication media may typically be embodied by computer readable instructions, data structures, program modules, or other data in a modulated data signal, such as a carrier wave or other transport mechanism, and includes any information delivery media.

The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 704, including operating system 705. While executing on processing unit 702, programming modules 706 (e.g., application 720 such as a media player) may perform processes including, for example, one or more stages of methods, algorithms, systems, applications, servers, databases as described above. The aforementioned process is an example, and processing unit 702 may perform other processes. Other programming modules that may be used in accordance with embodiments of the present disclosure may include sound encoding/decoding applications, machine learning application, acoustic classifiers and the like.

Generally, consistent with embodiments of the present invention, program modules may include routines, programs, components, data structures, and other types of structures that may perform particular tasks or that may implement particular abstract data types.

Moreover, embodiments of the present invention may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the present invention may also be practiced in distributed computing environments where tasks are performed by remote processing devices that are linked through a communications network. In a distributed computing environment, program modules may be located in both local and remote memory storage devices.

Furthermore, embodiments of the present invention may be practiced in an electrical circuit comprising discrete electronic elements, packaged or integrated electronic chips containing logic gates, a circuit utilizing a microprocessor, or on a single chip containing electronic elements or microprocessors. Embodiments of the present invention may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the present invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, embodiments of the present invention may be embodied in hardware and/or in software (including firmware, resident software, microcode, and the like). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, gore, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the present invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the present invention have been described, other embodiments may exist. Furthermore, although embodiments of the present invention have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM.

Further, the disclosed methods' stages may be modified in any manner, including by reordering stages and/or inserting or deleting stages, without departing from the disclosure.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

The invention claimed is:

1. A system for delivering in-app currency for use in connection with a specific feature of a plurality of features enabled through a software application residing in a memory operatively associated with a user device, the system comprising:
   a software application tool configured to enable, for each gift card of a plurality of gift cards for a plurality of different establishments, a selection of: (i) a predetermined amount of in-app currency; and (ii) the specific feature of the plurality of features in which the predetermined amount of in-app currency is redeemable, wherein the software application tool is further configured to launch a gift card offer wall independently of the plurality of features, the gift card offer wall displaying the plurality of gift cards;
   an electronic wallet associated with a user, the electronic wallet being configured to facilitate the purchase of a gift card displayed on the gift card offer wall, wherein the electronic wallet is further configured to store: (i) data regarding a purchased gift card, the purchased gift card being purchased from the gift card offer wall; and (ii) the selection associated with the purchased gift card of the predetermined amount of in-app currency and the specific feature in which the predetermined amount of in-app currency is redeemable; and
   a server configured to deliver the purchased gift card and the predetermined amount of in-app currency associated with the purchased gift card to the electronic wallet responsive to the purchase of the purchased gift card by the user, wherein the predetermined amount of in-app currency delivered to the electronic wallet enables in-app purchasing solely in connection with the specific feature.

2. The system of claim 1, wherein the plurality of features comprise a plurality of games.

3. The system of claim 2, wherein the in-app currency enables in-app purchasing solely during one or more game sessions of a specific game.

4. The system of claim 1, wherein the software application tool comprises a software development kit.

5. The system of claim 1, wherein the software application tool comprises an application programming interface.

6. The system of claim 1, further comprising a database storing at least a currency conversion rate, where the currency conversion rate determines how much of the in-app currency can be purchased with a predetermined amount of currency from the user's electronic wallet.

7. The system of claim 6, further comprising a dashboard in communication with the server, the dashboard being configured to provide an interface to enable setting the currency conversion rate.

8. The system of claim 7, wherein the dashboard enables a review of transactions involving the plurality of gift cards.

9. The system of claim 1, wherein, when the user purchases the purchased gift card via the electronic wallet, the server provides the user with a predetermined amount of currency usable to purchase the in-app currency.

10. The system of claim 1, further comprising a marketplace dashboard in communication with the server, the marketplace dashboard being configured to provide access to the server to enable product brands to bid for space on the gift card offer wall.

11. The system of claim 1, wherein the software application comprises a mobile application.

12. The system of claim 1, wherein the user device comprises a smartphone.

13. The system of claim 1, wherein the software application tool comprises a software development kit.

14. The system of claim 1, wherein the software application tool comprises an application programming interface.

15. A system for delivering in-app currency for use in connection with a specific game of a plurality of games enabled through a mobile application, the system comprising:
   a software application tool configured to enable, for each gift card of a plurality of gift cards for a plurality of different establishments, a selection of: (i) a predetermined amount of in-app currency; and (ii) the specific game of the plurality of games in which the predetermined amount of in-app currency is redeemable, wherein the software application tool is further configured to enable a user-accessible link, the user-accessible link being configured to launch a gift card offer wall independently of the plurality of games, the gift card offer wall displaying the plurality of gift cards;

an electronic wallet associated with a user, the electronic wallet being configured to facilitate the purchase of a gift card displayed on the gift card offer wall, wherein the electronic wallet is further configured to store: (i) data regarding a purchased gift card, the purchased gift card being purchased from the gift card offer wall; and (ii) the selection associated with the purchased gift card of the predetermined amount of in-app currency and the specific game in which the predetermined amount of in-app currency is redeemable; and a server configured to deliver the purchased gift card and the predetermined amount of in-app currency associated with the purchased gift card to the electronic wallet responsive to the purchase of the purchased gift card by the user, wherein the predetermined amount of in-app currency delivered to the electronic wallet enables in-app purchasing solely during one or more sessions of play of the specific game.

16. A system for offering a plurality of gift cards to a user of a mobile application, the mobile application enabling play of a plurality of game applications by the user, the system comprising:

an application programming interface allowing a publisher of the mobile application to include a feature enabling the user to launch a gift card offer wall from within the mobile application independently of a session of play of the plurality of game applications, the gift card offer wall providing offers, the offers consisting of a plurality of gift cards for a plurality of different establishments, the software development kit permitting the user to select and purchase any of the plurality of gift cards, the software development kit being configured to (i) enable the publisher, for each gift card of the plurality of gift cards, to set a predetermined amount of in-app currency to be granted to the user responsive solely to the user's purchase of such gift card for which the publisher has set a predetermined amount of in-app currency, wherein the in-app currency is non-redeemable at the plurality of different establishments, and (ii) enables the publisher to set the predetermined amount of in-app currency to be redeemable solely for in-app purchasing in a particular game application of the plurality of game applications enabled by the mobile application, wherein the software development kit is provided by a third party to the publisher;

an electronic wallet for the user of the mobile application, the electronic wallet providing a location to electronically store: (i) data regarding a gift card purchased by the user from the gift card offer wall for which a predetermined amount of in-app currency has been set by the publisher; and (ii) the predetermined amount of in-app currency;

at least one server, operated by the third party, providing communication between the mobile application, the software development kit and the electronic wallet, wherein when the user launches the gift card offer wall from within the mobile application and purchases a gift card for which a predetermined amount of in-app currency has been set by the publisher from the gift card offer wall, the server communicates to the mobile application to reward the user with the predetermined amount of in-app currency set by the publisher for the purchased gift card and the server delivers the purchased gift card and the predetermined amount of in-app currency to the electronic wallet of the user, wherein the predetermined amount of in-app currency delivered to the electronic wallet of the user enables in-app purchasing in the particular game application solely during one or more sessions of play of the particular game application, and the feature for a user to launch a gift card offer wall from within the mobile application includes accessing a gift card offer wall server configured to (1) display the gift card offer wall to the user, (2) receive an input from the user to select one of the plurality of gift cards from the gift card offer wall, and (3) complete a purchase of the selected gift card from the gift card offer wall, the gift card offer wall server operated by the third party.

17. The system of claim 16, further comprising a database storing at least a currency conversion rate, where the currency conversion rate determines how much of the in-app currency can be purchased with a predetermined amount of currency from the user's electronic wallet.

18. The system of claim 17, wherein when the user purchases the selected gift card via the electronic wallet, the server provides the user with a predetermined amount of currency usable to purchase the in-app currency.

* * * * *